(12) United States Patent
Wu et al.

(10) Patent No.: US 9,077,527 B2
(45) Date of Patent: *Jul. 7, 2015

(54) FULL-DUPLEX DIFFERENTIAL SERIAL LINK INTERFACE FOR DATA TRANSFERRING

(75) Inventors: Qiang Wu, Portland, OR (US); Caglar Yilmazer, Istanbul (TR); Mustafa Ertugrul Oner, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 605 days.

This patent is subject to a terminal disclaimer.

(21) Appl. No.: 13/349,274

(22) Filed: Jan. 12, 2012

(65) Prior Publication Data
US 2012/0106409 A1 May 3, 2012

Related U.S. Application Data

(63) Continuation of application No. 12/545,744, filed on Aug. 21, 2009, now Pat. No. 8,098,602.

(51) Int. Cl.
*H04L 12/56* (2006.01)
*H03C 5/00* (2006.01)
(Continued)

(52) U.S. Cl.
CPC .............. *H04L 5/14* (2013.01); *H04L 25/0272* (2013.01)

(58) Field of Classification Search
CPC ................ H04J 3/00; G08B 1/00; B60Q 1/00
USPC ......... 370/276, 280, 277, 278, 282, 535, 538, 370/428, 429, 425, 426, 210, 203, 204, 205, 370/208, 212, 215; 340/286.01, 438, 340/310.12, 538.11, 439, 310.01, 310.06; 375/222, 242, 257, 362
See application file for complete search history.

(56) References Cited

U.S. PATENT DOCUMENTS 5,426,527 A * 6/1995 Steen et al. ............... 398/68
6,226,296 B1 5/2001 Lindsey
(Continued)

FOREIGN PATENT DOCUMENTS

| WO | 2008056933 A1 | 5/2008 |
|----|---|---|
| WO | WO2008056933 A1 | 5/2008 |

OTHER PUBLICATIONS

Office Action dated Jan. 8, 2014, in related Japanese Patent Application No. 2010-186054 (3pgs).
(Continued)

*Primary Examiner* — Hanh N Nguyen
(74) *Attorney, Agent, or Firm* — North Weber & Baugh LLP (57) ABSTRACT

A data transmission technique where high speed data is transmitted differentially in a forward channel by way of a serial link, and relatively low speed data is differentially modulated onto the forward channel signal for transmission in a reverse channel via the link. By utilizing differential modulation in both forward and reverse channels, the resulting signal has a common mode voltage that is substantially constant, resulting in low EMI. The spectral content of the signal associated with the high speed data may be substantially non-overlapping with the spectral content of the signal associated with the low speed data. This facilitates the recovery of the high speed data and low speed data with minimal interference. The differential signaling lends itself for communicating data via an inexpensive medium, such as twisted wire pair or parallel PCB traces. The data transmission technique applies to various communication network topologies: point-to-point, daisy-chain, and point-to-multiple points.

20 Claims, 8 Drawing Sheets

(51) Int. Cl.
*H04L 5/14* (2006.01)
*H04L 25/02* (2006.01)

(56) References Cited

U.S. PATENT DOCUMENTS

| | | | |
|---|---|---|---|
| 6,272,130 B1 | 8/2001 | Panahi et al. | |
| 6,295,272 B1 * | 9/2001 | Feldman et al. | 370/210 |
| 6,404,326 B1 * | 6/2002 | Timmerman et al. | 340/286.01 |
| 7,304,567 B2 * | 12/2007 | Canfield | 340/438 |
| 7,327,381 B2 | 2/2008 | Suzuki | |
| 8,098,602 B2 * | 1/2012 | Wu et al. | 370/280 |
| 8,300,666 B2 * | 10/2012 | Karam et al. | 370/496 |
| 2007/0116135 A1 | 5/2007 | Tsuchida | |

OTHER PUBLICATIONS

Office Action dated Feb. 11, 2014, in related Chinese Patent Application No. 201010259078.7 (14pgs).

Decision of Rejection mailed May 7, 2014, in related Japanese Patent Application No. 2010-186054.

* cited by examiner

FULL-DUPLEX DIFFERENTIAL SERIAL LINK INTERFACE FOR DATA TRANSFERRING

CROSS-REFERENCE TO RELATED APPLICATIONS

The present invention is a continuation application under 35 U.S.C. §120 of U.S. patent application Ser. No. 12/545,744, filed Aug. 21, 2009 now U.S. Pat. No. 8,098,602 entitled "System and Method for Transferring Data Over Full-Duplex Differential Serial Link," which is hereby incorporated by reference in its entirety.

BACKGROUND

A. Technical Field

This invention relates generally to data transfer systems, and in particular, to a system and method for transferring data over a full-duplex differential serial link.

B. Background of the Invention

In many applications, high speed data needs to be transferred from a source to a sink substantially simultaneously with the transfer of low speed data. For example, in video applications, video data (e.g., relatively high speed data) needs to be transferred from a video source (e.g., a camera) to a video sink (e.g., a display). Simultaneously with the transfer of the video data, control data (e.g., relatively low speed data) needs to be transferred, in both directions, between the video source and the video sink. For example, control data from the video source to the video sink may dictate how the video data is to be displayed. While, for example, control data from the video sink to the video source may dictate the view angle, exposure, focus of the camera, or status of video device.

Typically, physical cables are used to communicate the high speed and low speed data between the source and sink. However, in many applications, such as in automotive and aircraft systems, it is generally desirable to reduce the physical space and weight of the cables used for transferring the data because of generally stringent space and weight requirements in automobiles and airplanes. In addition, due to the fact that automobile and aircraft video systems coexist with other sensitive systems (e.g., aircraft flight control and navigation systems), generally stringent electromagnetic interference (EMI) requirements are applied to such video systems.

Thus, there is a need for a system and method for simultaneously transferring high speed and low speed data using a simple and inexpensive physical medium in a relatively low EMI manner.

SUMMARY OF THE INVENTION

An aspect of the invention relates to a data transmission technique. According to the technique, relatively high speed serial data is transmitted using differential signaling in a forward channel by way of a communications link. Additionally, relatively low speed serial data is differentially modulated onto the forward channel signal for transmission in a reverse channel by way of the communications link. By utilizing full differential modulation in both the forward and reverse channels, the resulting signal has a common mode voltage that is substantially constant. This results in relatively low electromagnetic interference (EMI).

Furthermore, the spectral content of the resulting signal associated with the high speed serial data may be substantially non-overlapping with the spectral content of the resulting signal associated with the low speed serial data. This allows for the recovery of the high speed data and low speed data with minimal interference. Moreover, the differential signaling lends itself for the transfer of data via a relatively inexpensive communications link, such as a twisted wire pair or parallel printed circuit board (PCB) traces. Embodiments are described herein that implement this data transmission technique.

In another aspect of the invention, the data transmission technique entails time-multiplexing forward channel low speed serial data with the forward channel high speed data, and differentially transmitting the time-multiplexed data via the communications link. This results in full-duplex communications by allowing forward channel low and high speed serial data to be transmitted simultaneously with reverse channel low speed data. In a particular application, the forward channel high speed data may be video data, the forward channel low speed data may be audio data and control data for controlling one or more aspects of the video data displaying or imaging and sound production, and the reverse channel low speed serial data may be control data for controlling one or more aspects of the video and audio capturing and generating process. Embodiments are described herein that implement this data transmission technique.

In yet another aspect of the invention, forward channel low speed serial data may be differentially modulated onto the forward channel signal, in a similar manner as the reverse channel low speed serial data is differentially modulated onto the forward channel signal. In this regards, the communications link may be configured for a hybrid full- and half-duplex communications. That is, the transmission of the forward and reverse channel low speed serial data may be performed in a half-duplex manner. Whereas, the forward channel high speed serial data may be transmitted simultaneously with the forward or reverse channel low speed serial data. It shall be understood that other forward channel low speed data may be time-multiplexed with the forward channel high speed serial data. As an example, video and audio data may be transmitted via forward channel high speed serial data, and control data may be transmitted via forward and reverse channel low speed serial data. Embodiments are described herein that implements this data transmission technique.

In still another aspect of the invention, a system implementing the data transmission techniques may be configured as a point-to-point, point-to-multiple, daisy-chain, or ring structure. In a point-to-point system, a first communications device is transmitting the forward channel signal to a second communications device, while the second communication device is transmitting the reverse channel signal. In a point-to-multiple system, a first communications device is transmitting the forward channel signal to a plurality communications device, while the plurality of communications devices transmit reverse channel signals to the first communications device in a time-division multiplexed manner. In a daisy-chain, one or more repeaters or transceivers are interposed between first and second communications devices in order to extend the effective length of the communications link between the devices. And, in a ring structure system, communications devices are set up as transceivers for relaying forward and reverse channel communications to each other. Embodiments are described herein that implement this data transmission technique.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1A:
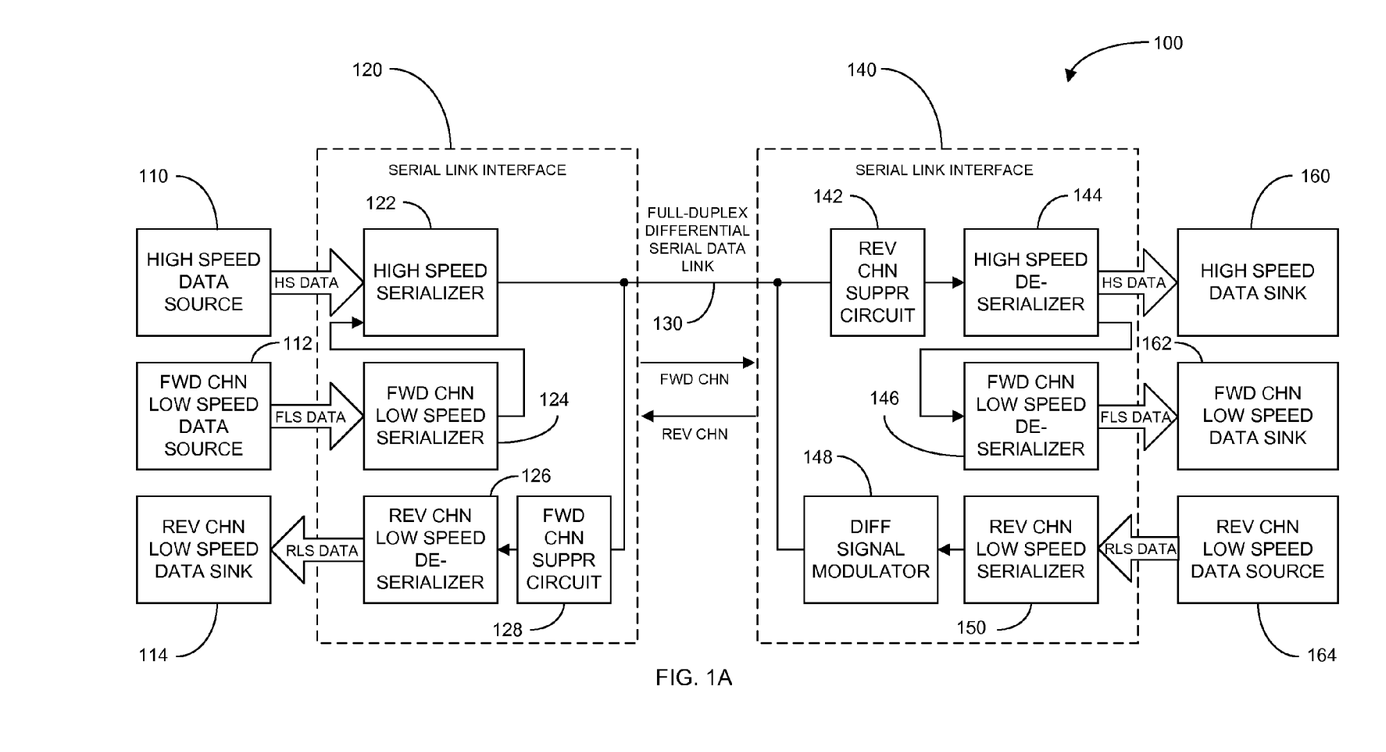
FIG. 1A illustrates a block diagram of an exemplary system for transferring data in accordance with an embodiment of the invention.

FIG. 1A illustrates a block diagram of an exemplary system 100 for transferring data in accordance with an embodiment of the invention. In summary, the system 100 employs a data transmission technique for providing a full-duplex differential serial data link. In particular, the data transmission technique entails transmitting high speed data (e.g., video data) and low speed data (e.g., audio and/or control data) in a forward channel simultaneously with the transmission of low speed data (e.g., control data) in a reverse channel. Additionally, the full-duplex transmission of the data may occur over a relatively inexpensive physical medium, such as a twisted conductor pair or parallel printed circuit board (PCB) traces. Furthermore, the data transmission may be in full differential signaling for improved EMI protection.

More specifically, the system 100 comprises a high speed data source 110, a forward channel (FWD CHN) low speed data source 112, and a reverse channel (REV CHN) low speed data sink 114, all of which are situated at one end of a full-duplex differential serial data link 130. The high speed data source 110 may generate parallel high speed (HS) data (e.g., video data). The FWD CHN low speed data source 112 may generate parallel, forward (channel) low speed (FLS) data (e.g., control and/or audio data). The REV CHN low speed data sink 114 may receive parallel, reverse (channel) low speed (RLS) data (e.g., control data).

The term "high speed data" means that it is transmitted at a rate higher than the "low speed data." For example, the high speed data may be video data. Whereas, the low speed data may be audio and/or control data. It shall be understood that "high speed data" need not be limited to video, and may encompass other types of data. Similarly, the "low speed data" need not be limited to control and/or audio data, and may encompass other types of data.

The system 100 further comprises a serial link interface 120 for interfacing the high speed data source 110, FWD CHN low speed data source 112, and REV CHN low speed data sink 114 to the communications link 130, which, in this case, is configured as a full-duplex differential serial data link. The serial link interface 120 comprises a high speed serializer 122, a FWD CHN low speed serializer 124, a REV CHN low speed deserializer 126, and a FWD CHN suppression circuit 128. The high speed serializer 122 converts the parallel HS data from the high speed data source 110, and time-multiplexes it with the serialized FLS data to generate a forward channel frame for transmission via the full-duplex differential serial data link 130.

The FWD CHN low speed serializer 124, in turn, converts the parallel FLS data from the FWD CHN low speed data source 112 into serial FLS data, which, as discussed, is time-multiplexed with the high speed serial data. In some cases, the FWD CHN low speed data source 112 may already generate FLS data in a serial manner. In such a case, the FWD CHN low speed serializer 124 may be eliminated, and the FWD CHN low speed data source 112 may be directly coupled to the high speed serializer 122.

The FWD CHN suppression circuit 128 suppresses the forward channel signal (e.g., the differential signaling of the serialized HS and FLS data) in order to substantially output the serial, reverse (channel) low speed (RLS) data received from the opposite end of the communications link 130. As an example, the FWD CHN suppression circuit 128 may be a low pass filter (LPF) or band pass filter (BPF) adapted to filter out the high-frequency forward channel signal. As another example, the FWD CHN suppression circuit 128 may be a signal cancellation device for substantially cancelling out the forward channel signal. The REV CHN low speed deserializer 126 converts the serial RLS data into parallel RLS data for processing by the REV CHN low speed data sink 114.

At the other end of the communications link 130, the system 100 comprises a high speed data sink 160, a FWD CHN low speed data sink 162, and a REV CHN low speed data source 164. The high speed data sink 160 receives and processes the parallel high speed (HS) data (e.g., video data) from the high speed data source 110. The FWD CHN low speed data sink 162 receives and processes the parallel FLS data (e.g., control and/or audio data) from the FWD CHN low speed data source 112. The REV CHN low speed data source 164 generates the parallel RLS data (e.g., control data) for transmission to the REV CHN low speed data sink 114.

The system 100 further comprises a serial link interface 140 for interfacing the high speed data sink 160, FWD CHN low speed data sink 162, and REV CHN low speed data source 164 to the communications link 130. The serial link interface 140 comprises a REV CHN suppression circuit 142, a high speed deserializer 144, a FWD CHN low speed deserializer 146, a REV CHN low speed serializer 150, and a differential signal modulator 148.

The REV CHN suppression circuit 142 suppresses the reverse channel signal (e.g., the differentially-modulated serialized RLS data) in order to substantially output the forward channel signal (e.g., the HS and FLS data) received from the opposite end of the communications link 130. As an example, the REV CHN suppression circuit 142 may be a high pass filter (RPF) or BPF adapted to filter out the low-frequency reverse channel signal. As another example, the REV CHN suppression circuit 142 may be a signal cancellation device for substantially cancelling out the reverse channel signal.

The high speed deserializer 144 converts the forward channel serial data into forward channel parallel data. The HS data portion of the forward channel parallel data is sent to the high speed data sink 160 for processing. The FLS data portion of the forward channel parallel data is sent to the FWD CHN low speed deserializer 146, which converts the FLS data into parallel. The parallel FLS data is sent to the FWD CHN low speed data sink 162 for processing. In some cases, the FWD CHN low speed data sink 162 may have a serial data input to receive the FLS data, and the FLS data portion of the HS data is only a single bit. In such a case, the FWD CHN low speed deserializer 146 may be eliminated, and the corresponding bit of the high speed deserializer 144 may be connected directly to the FWD CHN data sink 162.

The REV CHN low speed serializer 150 converts the parallel RLS data from the REV CHN low speed data source 164 into serial RLS data. In some cases, the REV CHN low speed data source 164 outputs the RLS data in a serial manner. In such a case, the REV CHN low speed serializer 150 may be eliminated, and the REV CHN low speed data source 164 may be coupled directly to the differential signal modulator 148. The differential signal modulator 148 differentially modulates the forward channel signal with the RLS data. The differential signal modulator 148 may include a slew rate control in order to modulate the forward channel signal in a relatively slow manner in order to control the spectral content of the reverse channel so that it is substantially isolated from the spectral content of the forward channel.

Figure 1B:
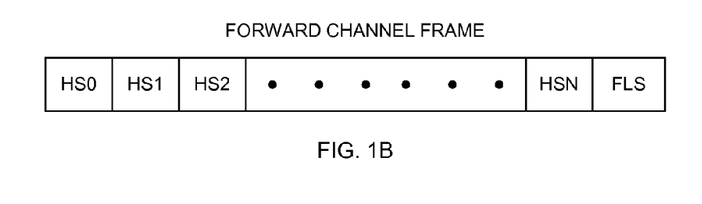
FIG. 1B illustrates a signal diagram of an exemplary forward channel data frame in accordance with another embodiment of the invention.

FIG. 1B illustrates a signal diagram of an exemplary forward channel data frame in accordance with another embodiment of the invention. In this example, the forward channel frame includes an entire word of the HS data. For instance, HS data bits HS0 to HSN are included in the forward channel frame, where N+1 is the length of the HS data word. Additionally, the forward channel frame includes a portion of a word of the FLS data. For instance, a single bit of the forward channel frame is reserved for the FLS data. It shall be understood that more than one bit of the forward channel may be used for the FLS data and/or other data.

Figure 1C:
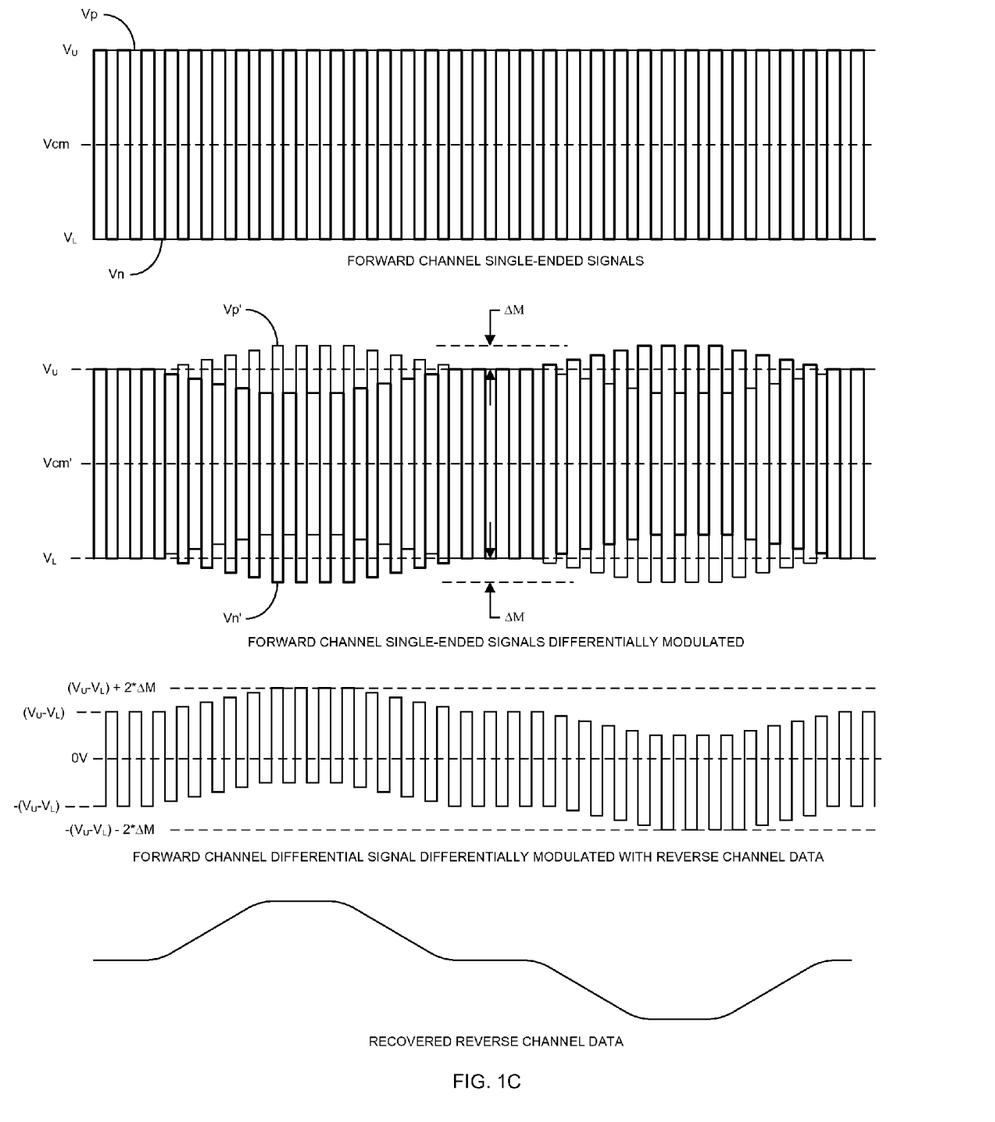
FIG. 1C illustrates time-domain graphs of exemplary signals of the forward and reverse channels in accordance with another embodiment of the invention.

FIG. 1C illustrates time-domain graphs of exemplary signals of the forward and reverse channels in accordance with another embodiment of the invention. The first (top) graph shows the positive and negative components of the forward channel single-ended signals. The second graph shows the positive and negative components of the forward channel single-ended signals differentially modulated. The third graph shows the forward channel single-ended differentially modulated with reverse channel data. And, the fourth (bottom) graph shows the recovered reverse channel data.

Referring to the first graph, the forward channel single-ended signals comprise a first voltage signal Vp and a second voltage signal Vn. In the first graph, the first voltage signal Vp is represented by a relatively thin line, and the second voltage signal Vn is represented by a relatively thick line. The first and second voltage signals Vp and Vn swing between an upper voltage $V_U$ and a lower voltage $V_L$. The forward channel differential signal Vdm is the difference between the first voltage signal Vp and the second voltage signal Vn (e.g., Vdm=Vp−Vn). The forward channel differential signal Vdm has a common mode voltage Vcm situated substantially half way between the upper voltage $V_U$ and the lower voltage $V_L$ (e.g., Vcm=$(V_U+V_L)$/2). The common mode voltage Vcm remains substantially constant since the differential signals Vp and Vn are varying in a mirroring fashion about the common mode voltage Vcm. This results in relatively low electromagnetic interference (EMI).

In this example, in the first (left-most) cycle, the first voltage signal Vp is at the lower voltage $V_L$, and the second voltage signal Vn is at the upper voltage $V_U$. Thus, the differential signal Vdm is equal to $V_L-V_U$, which may represent a particular logic level. In the second cycle, the first voltage signal Vp is at the upper voltage $V_U$, and the second voltage signal Vn is at the lower voltage $V_L$. Thus, the differential signal Vdm is equal to $V_U-V_L$, which may represent the opposite logic level. Accordingly, in this example, the forward channel differential signal IS delivering alternating logic levels.

Referring to the second graph, the forward channel single-ended signals are low frequency and differentially modulated by the reverse channel signal. The differentially modulated single-ended signals comprise a first modulated voltage signal Vp' and a second modulated voltage signal Vn'. In one cycle of the reverse channel signal, the first modulated voltage signal Vp' may be at an upper voltage of $V_U+\Delta M$, and the second modulated voltage signal Vn' may be at a lower voltage of $V_L-\Delta M$. Thus, the modulated differential signal Vdm', being equal to Vp'−Vn', has a value of $V_U-V_L+2*\Delta M$, which indicates a particular reverse channel logic level. In another cycle of the reverse channel signal, the first modulated voltage signal Vp' may be at the lower voltage of $V_L-\Delta M$, and the second modulated voltage signal Vn' may be at the upper voltage of $V_U+\Delta M$. Thus, the modulated differential signal Vdm' has a value of $-(V_U-V_L)-2*\Delta M$, which indicates another reverse channel logic level.

The modulated common mode voltage Vern', being equal to (Vp'+Vn')/2, is substantially constant at $(V_U+V_L)$/2. Thus, the modulated common mode voltage Vern' remains substantially constant, while the modulated differential signals Vp' and Vn' are varymg. This results in relatively low electromagnetic interference (EMI). The third graph illustrates the forward channel differential signal Vdm' differentially modulated with the reverse channel data. The fourth graph illustrates the resulting signal (e.g., the recovered reverse channel signal) from the processing of the modulated differential voltage Vdm' signal by the REV CHN suppression circuit 128.

Figure 2A:
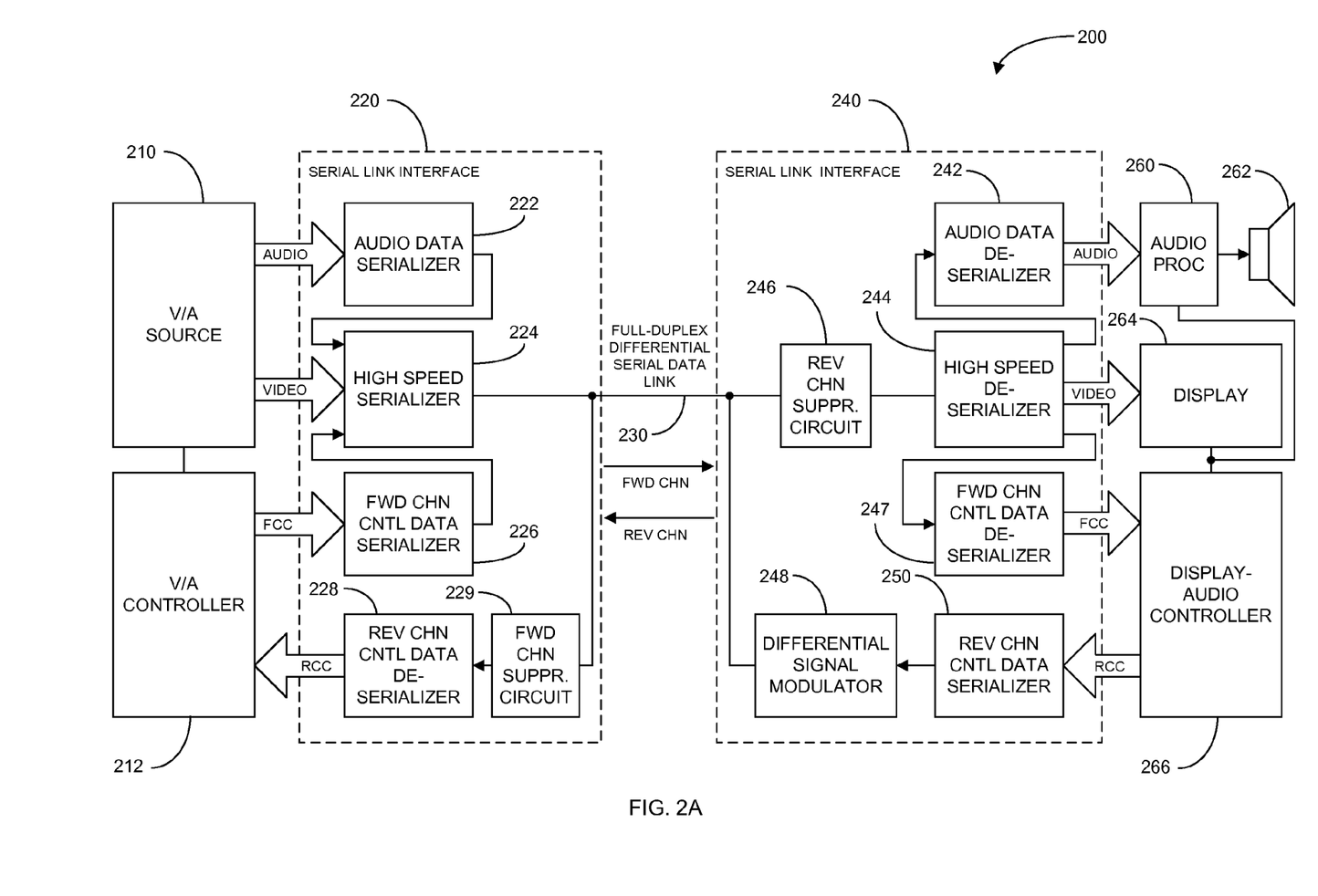
FIG. 2A illustrates a block diagram of another exemplary system for transferring data in accordance with another embodiment of the invention.

FIG. 2A illustrates a block diagram of another exemplary system 200 for transferring data in accordance with another embodiment of the invention. In summary, the system 200 is an exemplary application of the generic system 100, previously described. In particular, the system 200 is configured for transferring multimedia data, such as video and audio data, and control data in a forward channel, and transferring control data in a reverse channel. This may be the case where a video/audio (V/A) source, such as a camera or DVD player, sends video, audio, and control data to a display in the forward channel. The forward channel control data may dictate how the video is to be displayed and how the audio is to be reproduced. The display and audio circuit may include an associated controller for sending control data back to the V/A source in the reverse channel. The reverse channel control data may dictate how the V/A source generates the video and audio data.

More specifically, the system 200 comprises a video/audio (V/A) source 210 and a V/A controller 212, both situated at one end of a full-duplex differential serial data link 230. The V/A source 210, under the control of the V/A controller 212, generates parallel video data and parallel audio data. As an example, the audio data may be in adaptive I2S format. The V/A controller 212 may generate parallel forward channel control (FCC) data. The V/A controller 212 may also receive parallel, reverse channel control (RCC) data. As previously discussed, the FCC data may be for controlling one or more aspects of the video displaying and/or audio playback. The RCC data may be for controlling one or more aspects of the capturing and generating of the video and audio data. The data transfer rate of the video data is typically higher than the data transfer rate of the audio and FCC data.

The system 200 further comprises a serial link interface 220 for interfacing the V/A source 210 and V/A controller 212 to the full-duplex differential serial data link 230. The serial link interface 220 comprises an audio data serializer 222, a high speed serializer 224, a FWD CHN control data serializer 226, a REV CHN control data deserializer 228, and a FWD CHN suppression circuit 229.

The audio data serializer 222 converts parallel audio data from the V/A source 210 into serial audio data. Similarly, the FWD CHN control data serializer converts parallel FCC data from the V/A controller 212 into serial FCC data. The high speed serializer 224 converts the parallel video data from the V/A source 210, and time-multiplexes it with the serialized audio data and the serialized FCC data to generate a forward channel frame for transmission via the full-duplex differential serial data link 230. In some cases, the V/A controller 212 may generate the FCC data in a serial manner, instead of in a parallel manner. In such a case, the FWD CHN control data serializer 226 may be eliminated, and the V/A controller 212 may be directly coupled to the high speed serializer 224.

The FWD CHN suppression circuit 229 suppresses the forward channel signal in order to substantially output the serial, reverse control (RCC) data received from the opposite end of the full-duplex differential serial data link 230. As an example, the FWD CHN suppression circuit 229 may be a LPF or BPF adapted to filter out the forward channel signal. As another example, the FWD CHN suppression circuit 229 may be a signal cancellation device adapted to substantially cancel out the forward channel signal. The REV CHN control data deserializer 228 converts the serial RCC data into parallel RCC data for processing by the V/A controller 212. In some cases, the V/A controller 212 may be configured to receive RCC data in a serial manner, instead of in a parallel manner. In such a case, the REV CHN control data deserializer 228 may be eliminated, and the V/A controller 212 may be directly coupled to the FWD CHN suppression circuit 229.

At the other end of the full-duplex differential serial data link 230, the system 200 comprises an audio processor 260, a transducer 262 (e.g., a speaker), a display 264 (e.g., a liquid crystal display (LCD)), and a display-audio controller 266. The audio processor 260, under the control of the display-audio controller 266, processes the received parallel audio data to generate an analog audio signal for driving the speaker 262. The display 264, under the control of the display-audio controller 266, processes the received parallel video data in order to display the corresponding images. The display-audio controller 266 may control the audio processor 260 and display 264 based on the received FCC data. Additionally, the display-audio controller 266 may generate RCC data for transmission to the V/A controller 212 in order to control one or more operations of the V/A source 210.

The system 200 further comprises a serial link interface 240 for interfacing the audio processor 260, display 264, and display-audio controller 266 to the full-duplex differential serial data link 230. The serial link interface 240 comprises an audio data deserializer 242, a REV CHN suppression circuit 246, a high speed deserializer 244, a FWD CHN control data deserializer 247, a differential signal modulator 248, and a REV CHN control data serializer 250.

The REV CHN suppression circuit 246 suppresses the reverse channel signal (e.g., the RCC data) in order to substantially output the forward channel signal (e.g., video, audio, and FCC data). As an example, the REV CHN suppression circuit 246 may be a RPF or BPF adapted to filter out the reverse channel signal. Alternatively, the REV CHN suppression circuit 246 may be a signal cancellation device for substantially cancelling out the reverse channel signal.

The high speed deserializer 244 converts the forward channel serial data into forward channel parallel data. The video data portion of the forward channel parallel data is sent to the display 264 for image displaying purposes. The audio data portion of the forward channel parallel data is sent to the audio data deserializer 242. The audio data deserializer 242 converts the serial audio data into parallel audio data, and provides the parallel audio data to the audio processor 260 for sound generating purposes. The FCC data portion of the forward channel parallel data is sent to the FWD CHN control data deserializer 247, which converts the FCC data into parallel. The parallel FCC data is sent to the display-audio controller 266 for processing. In some cases, the display-audio controller 266 may only receive control data via a serial port. In such a case, the FWD CHN control data deserializer 247 may be eliminated, and the corresponding bit output of the high speed deserializer 244 may be connected directly to the serial port of the display-audio controller 266.

The REV CHN control data serializer 250 converts the parallel RCC data from the display-audio controller 266 into serial RCC data. The differential signal modulator 248 differentially modulates the forward channel signal with the RCC data. The differential signal modulator 248 may include a slew rate control in order to modulate the forward channel signal in a relatively slow manner in order to control the spectral content of the reverse channel so as to substantially isolate it from the spectral content of the forward channel. In some cases, the display-audio controller 266 may only output control data via a serial port. In such a case, the FWD CHN control data serializer 250 may be eliminated, and the corresponding bit output of the display-audio controller 266 may be connected directly to the differential signal modulator 248.

Figure 2B:
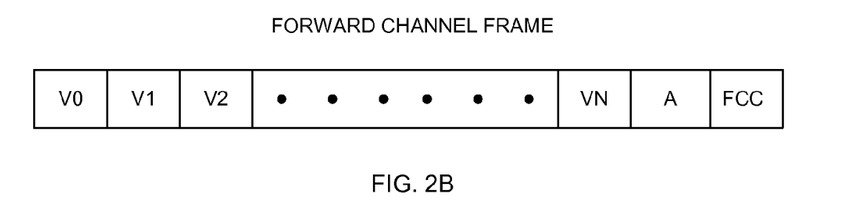
FIG. 2B illustrates a signal diagram of another exemplary forward channel data frame in accordance with another embodiment of the invention.

FIG. 2B illustrates a signal diagram of an exemplary forward channel data frame in accordance with another embodiment of the invention. In this example, the forward channel frame includes an entire word of the video data. For instance, video data bits V0 to VN are included in the forward channel frame, where N+1 is the length of the video data word. Additionally, the forward channel frame includes a portion (e.g., one bit) of the audio data word. Further, the forward channel frame includes a portion (e.g., one bit) of the FCC data word. It shall be understood that more than one bit of the forward channel frame may be used for the audio data as well as for the FCC data.

Figure 3:
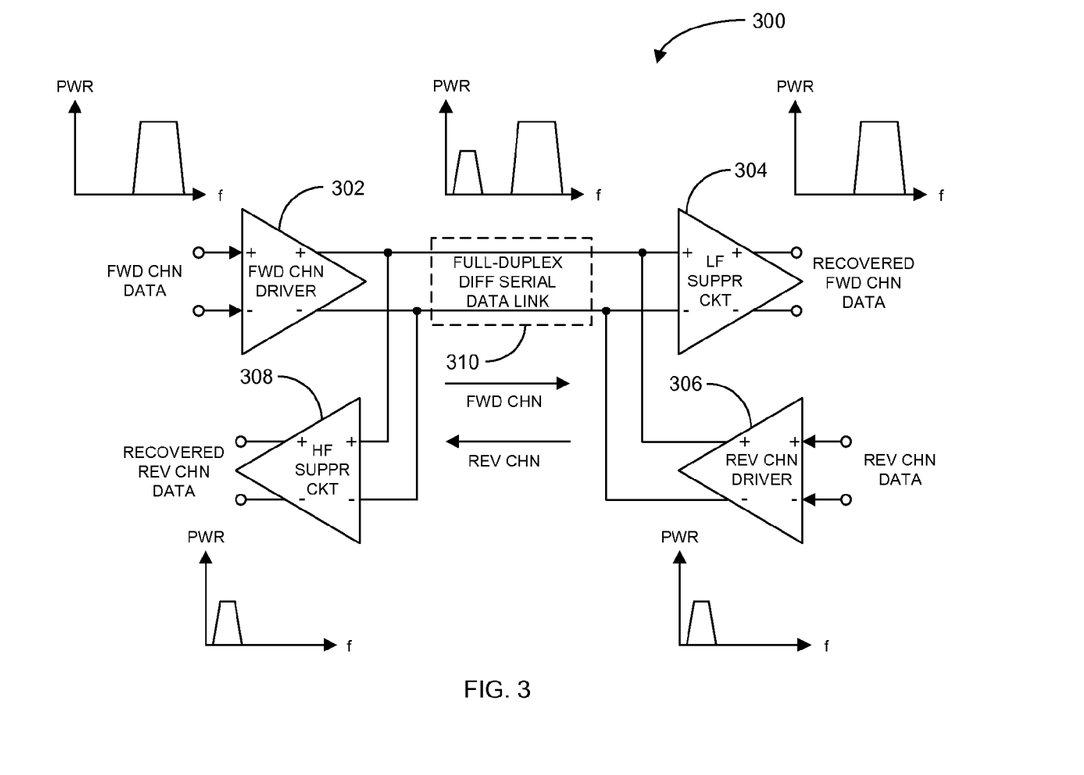
FIG. 3 illustrates a block diagram of another exemplary system for transferring data in accordance with another embodiment of the invention.

FIG. 3 illustrates a block diagram of another exemplary system 300 for transferring data in accordance with another embodiment of the invention. In summary, the system 300 is used to exemplify the spectral content and processing of the forward and reverse channel signals in accordance with the concepts described herein. The system 300 comprises a FWD CHN driver 302 and a high frequency suppression circuit 308, both situated at a first end of a full-duplex differential serial link 310. The system 300 further comprises a low frequency (LF) suppression circuit 304 and a REV CHN driver 306, both situated at a second and opposite end of the full-duplex differential serial link 310.

As noted, the FWD CHN data, which is applied differentially to the inputs of the FWD CHN driver 302, has a relatively high frequency, band limited spectral content. Similarly, as noted, the REV CHN data, which is applied differentially to the inputs of the REV CHN driver 306, has a relatively low frequency, band limited spectral content. At the full-duplex differential serial data link 310, the forward channel signal is differentially modulated by the reverse channel signal. Thus, as noted, the spectral content of the modulated signal may include substantially non-overlapping low and high frequency spectral bands.

The LF suppression circuit 304, which may be an HPF, BPF, or low frequency cancellation circuit, removes the reverse channel signal to produce or recover the FWD CHN data, as noted. Similarly, the HF suppression circuit 308, which may be a LPF, BPF, or high frequency cancellation circuit, removes the forward channel signal to produce or recover the REV CHN data, as noted.

Figure 4:
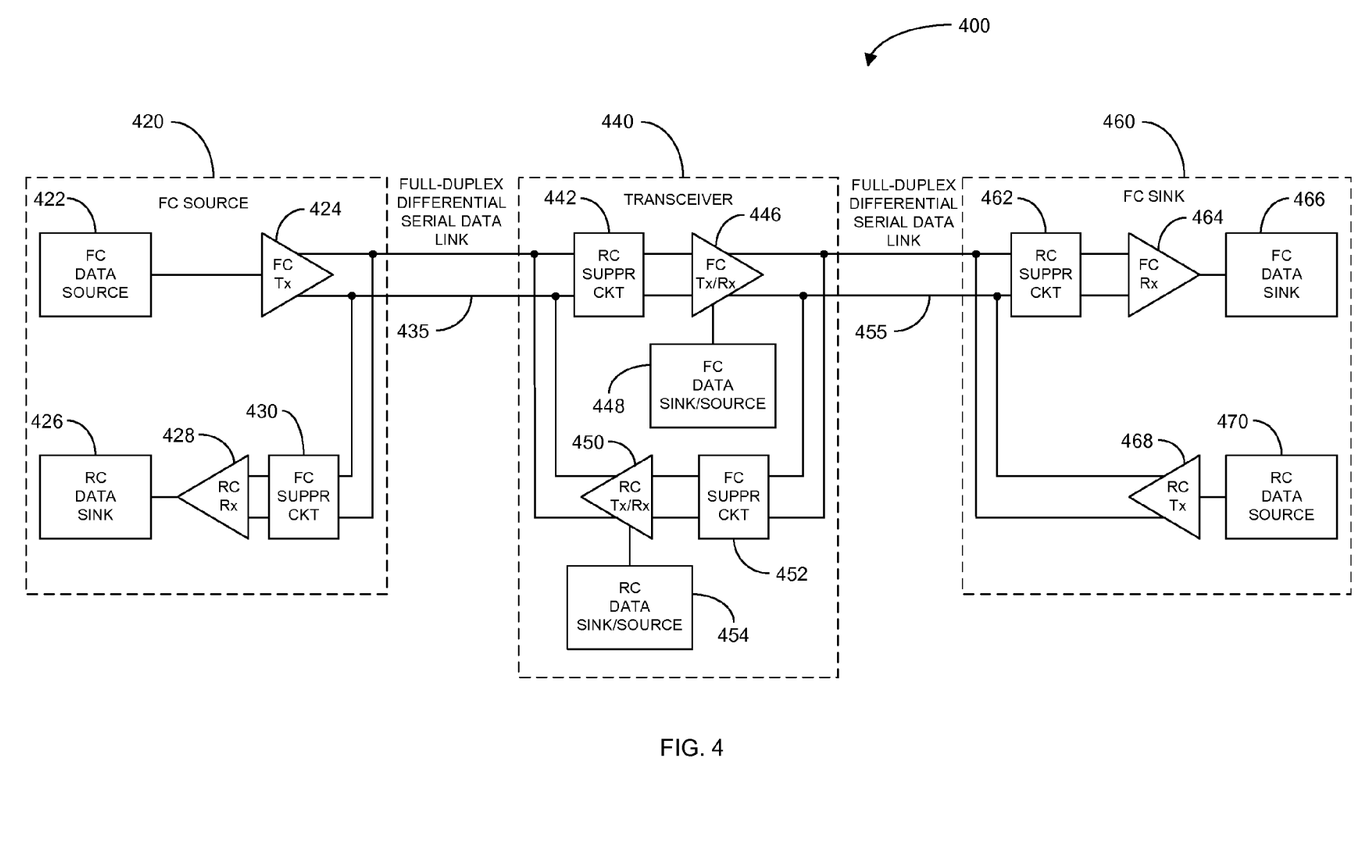
FIG. 4 illustrates a block diagram of another exemplary system for transferring data in accordance with an embodiment of the invention.

FIG. 4 illustrates a block diagram of another exemplary system 400 for transferring data in accordance with another embodiment of the invention. The systems 100 and 200 previously described may have a practical limitation on the length of the physical medium used for the full-duplex differential serial data link. That is, the forward and reverse channel signals may degrade to an unrecoverable level if the length of the serial data link is too long. To effectively extend the length of the communications link, one or more repeaters or transceivers may be implemented in a daisy-chain manner between both ends of the communications link. Additionally, such systems may be modified to form a ring structure by configuring each element of the ring as a repeater or transceiver. However, in this example, the system 400 employs a repeater or transceiver to effectively extend the length of the serial data link.

In particular, the system 400 comprises a forward channel (FC) source 420, a transceiver 440, and a forward channel (FC) sink 460. The system 400 further comprises a full-duplex differential serial data link 435 coupling the FC source 420 to the transceiver 440, and another full-duplex differential serial data link 455 coupling the transceiver 440 to the FC sink 460.

The FC source 420, in turn, comprises an FC data source 422, an FC transmitter (Tx) 424, an FC suppression circuit 430, an RC receiver (Rx) 428, and an RC data sink 426. The FC data source 422 generates data for the forward channel, which may include relatively high speed data and embedded relatively low speed data, as previously discussed. The FC Tx 424 forms the differential signaling of the FC data for transmission via the full-duplex differential serial data link 435. The FC suppression circuit 430 substantially suppresses the FC data signal in order to recover RC data signal received from the transceiver 440 or the FC sink 460 via the transceiver 440. The RC Rx 428 recovers the RC data and provides it to the RC data sink 426 for processing.

The FC sink 460, in turn, comprises an RC data source 470, an RC Tx 468, an RC suppression circuit 462, an FC Rx 464, and an FC data sink 466. The RC data source 470 generates relatively low speed data for the reverse channel. The RC Tx 468 differentially modulates the FC signal with the RC data for transmission via the full-duplex differential serial data link 455. The RC suppression circuit 462 substantially suppresses the RC data signal in order to recover FC data received from the transceiver 440 or the FC source 420 via the transceiver 440. The FC Rx 464 recovers the FC data and provides it to the FC data sink 466 for processing. As previously discussed, the FC data may include the relatively high speed data, as well as the embedded relatively low speed data.

The transceiver 440, in turn, comprises an RC suppression circuit 442, an FC Tx/Rx 446, an FC data sink/source 448, an FC suppression circuit 452, an RC Tx/Rx 450, and an RC data sink/source 454. The RC suppression circuit 442 substantially suppresses the RC data signal from the full-duplex differential serial data link 435 in order to recover the FC data signal received from the FC source 420. The FC Tx/Rx 446 may recover the FC data and provide it to the FC data sink/source 448 for further processing. Alternatively, or in addition to, the FC Tx/Rx 446 may amplify and pass-thru the received FC signal for transmission to the FC sink 460 by way of the full-duplex differential serial data link 455. As previously discussed, the FC data may include the relatively high speed data, as well as the embedded relatively low speed data.

The FC suppression circuit 452 substantially suppresses the FC data signal from the full-duplex differential serial data link 455 in order to recover RC data signal received from the FC sink 460. The RC Tx/Rx 450 may recover the RC data and provide it to the RC data sink/source 454 for processing. Alternatively, or in addition to, the RC Tx/Rx 450 may amplify and pass-thru the received RC signal for transmission to the FC source 420 by way of the full-duplex differential serial data link 435.

Figure 5:
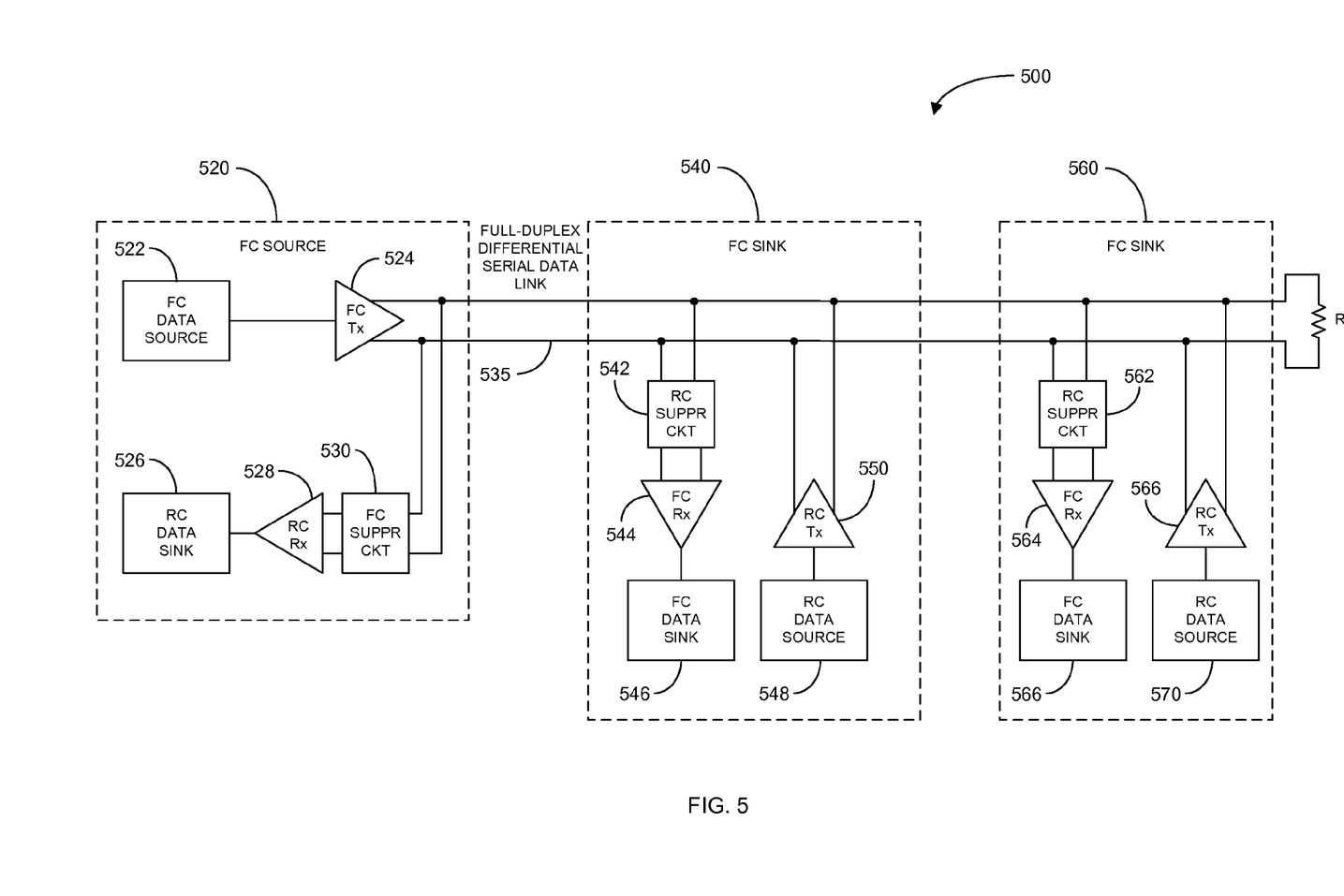
FIG. 5 illustrates a block diagram of another exemplary system for transferring data in accordance with another embodiment of the invention.

FIG. 5 illustrates a block diagram of another exemplary system 500 for transferring data in accordance with another embodiment of the invention. The systems 100 and 200 previously described only exemplified a single forward channel receiver. It shall be understood that such systems may include a plurality of forward channel receivers. For example, such systems may be configured as a point-to-multiple system. In this regards, the system 500 employs a pair of FC sinks for respectively receiving forward channel data from an FC source. It shall be understood that the system 500 may include more FC sinks for receiving forward channel data from the FC source.

In particular, the system 500 comprises an FC source 520, a first FC sink 540, and a second FC sink 560. The system 500 further comprises a full-duplex differential serial data link 535 coupling the FC source 520 to the first and second FC sinks 540 and 560. The full-duplex differential serial data link 535 may be terminated by a resistor RT at an end opposite the FC source 520.

The FC source 520, in turn, comprises an FC data source 522, an FC Tx 524, an FC suppression circuit 530, an RC Rx 528, and an RC data sink 526. The FC data source 522 generates data for the forward channel, which may include relatively high speed data and embedded relatively low speed data, as previously discussed. The FC Tx 524 forms the differential signaling of the FC data for transmission via the full-duplex differential serial data link 535. The FC suppression circuit 530 substantially suppresses the FC data signal in order to recover RC data signal received from the first and/or second FC sinks 540 and 560. The RC Rx 528 recovers the RC data and provides it to the RC data sink 526 for processing.

The first FC sink 540, in turn, comprises an RC suppression circuit 542, an FC Rx 544, an FC data sink 546, an RC data source 548, and an RC Tx 550. The RC suppression circuit 542 substantially suppresses the RC data signal in order to recover the FC data signal received from the FC source 520 via the full-duplex differential serial data 535. The FC Rx 544 recovers the FC data and provides it to the FC data sink 546 for processing. As previously discussed, the FC data may include the relatively high speed data, as well as the embedded relatively low speed data. The RC data source 548 generates relatively low speed data for the reverse channel. The RC Tx differentially modulates the FC signal with the RC data for transmission to the FC source 520 via the full-duplex differential serial data link 535.

The second FC sink 560 may be configured similarly or substantially the same as FC sink 540. For example, the FC sink 560 comprises an RC suppression circuit 562, an FC Rx 564, an FC data sink 566, an RC data source 570, and an RC Tx 566. The RC suppression circuit 562 substantially suppresses the RC data signal in order to recover FC data signal received from the FC source 520 via the full-duplex differential serial data 535. The FC Rx 564 recovers the FC data and provides it to the FC data sink 566 for processing. As previously discussed, the FC data may include the relatively high speed data, as well as the embedded relatively low speed data. The RC data source 570 generates relatively low speed data for the reverse channel. The RC Tx 566 differentially modulates the FC signal with the RC data for transmission to the FC source 520 via the full-duplex differential serial data link 535.

The RC data from the second FC sink 560 may be time-division multiplexed with the RC data from the first FC sink 540 for transmission to the FC source 520. As an example, the FC sink 540 and FC sink 560 may be configured respectively as master and slave devices for priority in using the serial data link 535 for transmission of the RC data. In this regards, the FC sink 540 may use the serial data link 535 whenever it wants to transmit the RC data, and may give permission to the FC sink 560 to transmit the RC data via the serial data link. Other types of anti-collision or time-division multiplexing uses of the serial data link for transmission of the RC data may be employed.

Figure 6:
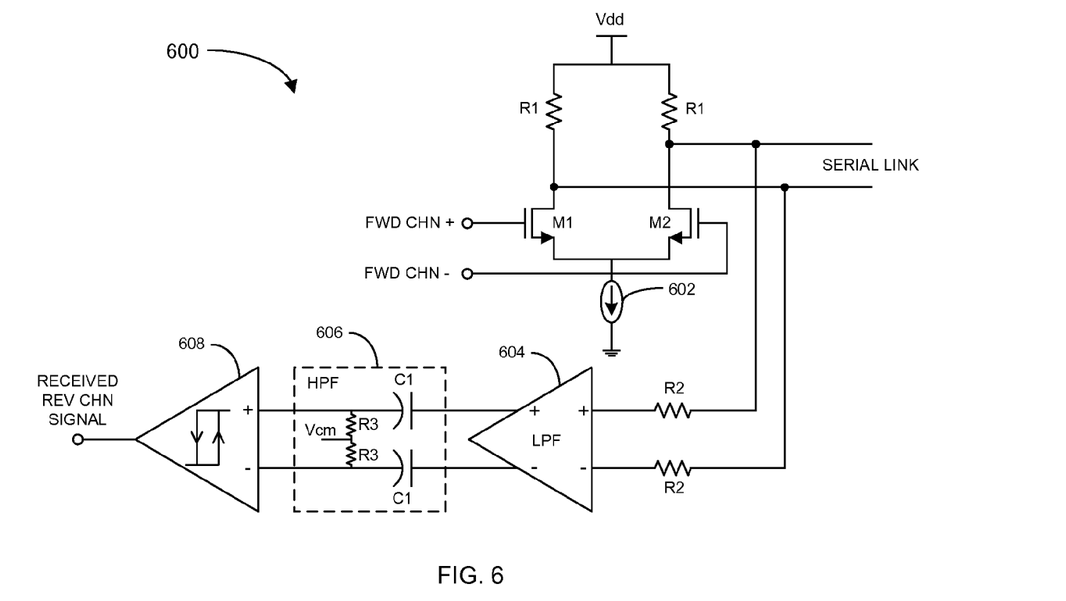
FIG. 6 illustrates a block diagram of an exemplary forward channel high speed data transmitter and reverse channel low speed data receiver in accordance with another embodiment of the invention.

FIG. 6 illustrates a block diagram of an exemplary high-speed data transmitter and low-speed data receiver 600 in accordance with another embodiment of the invention. The system 600 is one exemplary implementation of the FC source 420 and 520 of systems 400 and 500, respectively. In particular, the system 600 comprises a forward channel transmitter including a pair of resistors R1, a differential pair of transistors M1 and M2 (e.g., metal oxide semiconductor field effect transistors (MOSFETs), and a current source 602. The resistors R1 are coupled between a positive supply voltage rail Vdd and the drains of FETs M1 and M2, respectively. The resistors R1 provide a termination load for the serial link, and may be configured to have a resistance of 50 Ohms. The current source 602 is coupled between the sources of FETs M1 and M2, and a negative supply voltage rail, which could be ground. The forward channel data is applied differentially to the gates of the FETs M1 and M2. The pair of conductors of the serial link are coupled to the drains of FETs M1 and M2, respectively.

The system 600 further comprises a reverse channel receiver including resistors R2, LPF 604, HPF 606, and a hysteresis comparator 608. The resistors R2 are coupled between the pair of conductors of the serial link, and the positive and negative inputs of the LPF 604, respectively. The resistors R2 should be configured to have a relatively large resistance so as not to significantly load the serial link. The LPF 604 substantially removes the forward channel signal in order to recover or produce the reverse channel signal. The HPF 606, in turn, includes a pair of capacitors C1 coupled between the positive and negative outputs of the LPF 604 and the positive and negative inputs of the hysteresis comparator 608, respectively. Additionally, the HPF 606 comprises a pair of resistors R3 coupled in series between the positive and negative inputs to the hysteresis comparator 608, and adapted to receive a common mode voltage Vcm at a node between the resistors R3. The HPF 606 is adapted to substantially remove the DC component of the received signal. The LPF 604 coupled in series with the HPB 606 collaboratively operate as a band pass filter (BPF). The hysteresis comparator 608 produces the reverse channel data from the received signal by, for example, producing a logic high signal in response to a rising edge of the received signal and a logic low signal in response to a falling edge.

Figure 7:
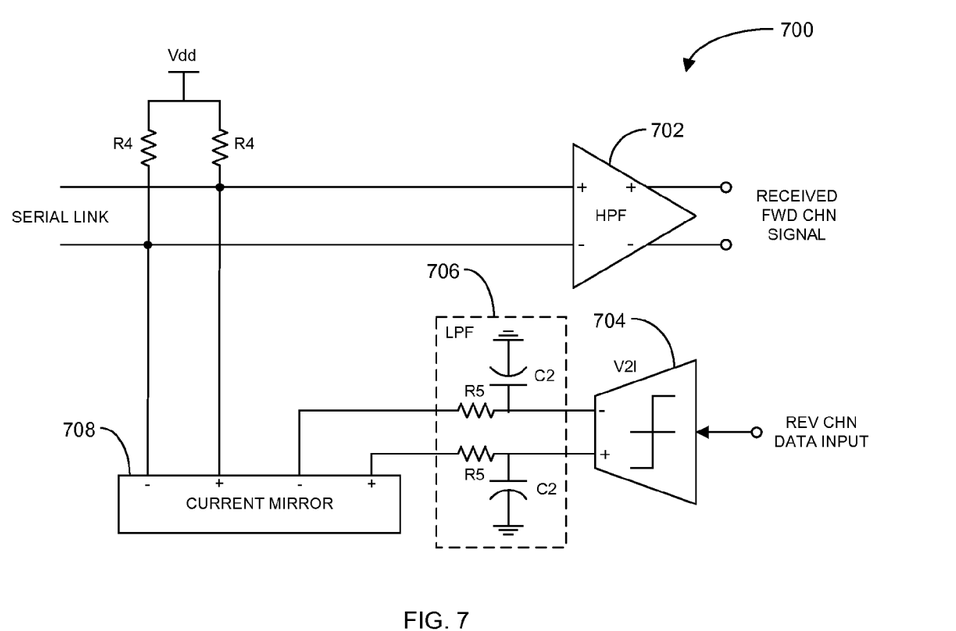
FIG. 7 illustrates a block diagram of an exemplary forward channel high speed data receiver and reverse channel low speed data transmitter in accordance with another embodiment of the invention.

FIG. 7 illustrates a block diagram of an exemplary high-speed data receiver and low-speed data transmitter 700 in accordance with another embodiment of the invention. The system 700 is one exemplary implementation of the FC sinks 460 of system 400, and 540 and 560 of system 500. In particular, the system 700 comprises a forward channel receiver including an HPF 702, and a reverse channel transmitter including voltage-to-current (V2I) converter 704, an LPF 706, a current mirror 708, and a pair of resistors R4. The HPF 702 includes positive and negative inputs coupled to the pair of conductors of the serial link, respectively. The HPF 702 removes the reverse channel signal in order to produce the received forward channel signal.

The V2I receives the reverse channel data, and generates positive and negative currents based on the data. The LPF 706 comprises a pair of resistors R5 coupled between the positive and negative outputs of the V2I 704 and the positive and negative inputs of the current mirror 708, respectively. Additionally, the LPF 706 comprises a pair of capacitors C2 coupled respectively to the positive and negative outputs of the V2I 704 and the negative supply voltage, which could also be at ground potential. The LPF 706 controls the slew rate of the reverse channel signal so that its spectral content does not significantly interfere with the spectral content of the forward channel data. The positive and negative outputs of the current mirror 708 are coupled to the pair of conductors of the serial link, respectively. The resistors R4 are coupled between the positive supply voltage rail Vdd and the serial link conductors, respectively. The resistors R4 provide a termination load for the serial link, and may be configured to have a resistance of 50 Ohms. In this configuration, the current mirror 708 differentially modulates the forward channel signal in response to the reverse channel data.

Figure 8:
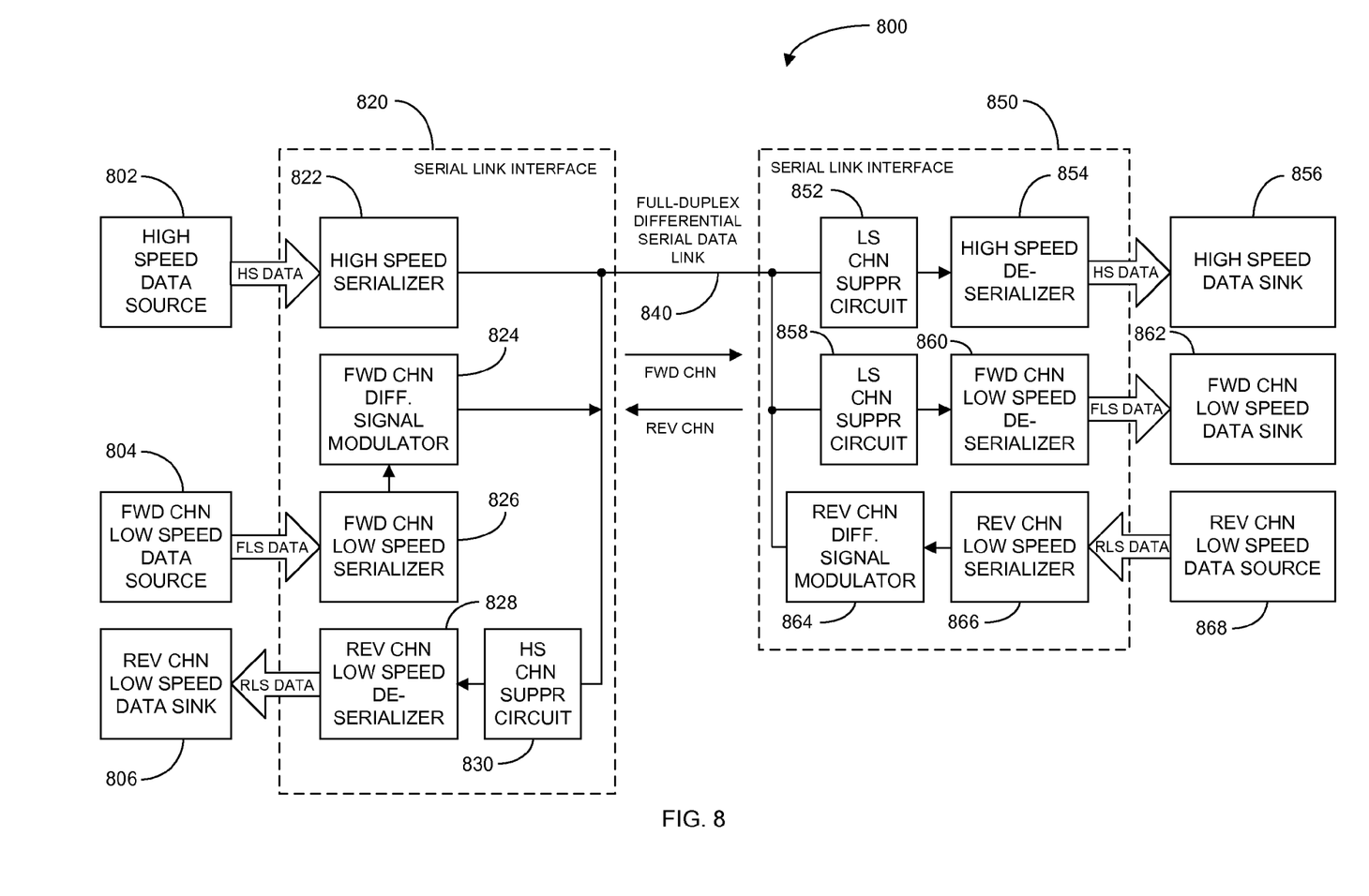
FIG. 8 illustrates a block diagram of another exemplary system for transferring data in accordance with another aspect of the disclosure.

FIG. 8 illustrates a block diagram of another exemplary system 800 for transferring data in accordance with another aspect of the disclosure. In the previously-described system 100, the forward channel low speed data was time-multiplexed with the high speed data for transmission in the forward direction via the full-duplex differential serial data link. The reverse channel low speed data was differentially modulated onto the forward channel signal for transmission in the reverse direction via the full-duplex differential serial data link. In system 800, the forward channel low speed data is differentially modulated onto the high speed forward channel signal, in the same manner as the reverse channel low speed is differentially modulated onto the high speed forward channel signal.

In particular, the system 800 comprises a high speed data source 802, a forward channel (FWD CHN) low speed data source 804, and a reverse channel (REV CHN) low speed data sink 806, all of which are situated at one end of a full-duplex differential serial data link 840. The high speed data source 802 may generate parallel high speed (HS) data (e.g., video data). Alternatively, the high speed data source 802 may be a high-speed clock source to establish the half-duplex control channel over a clock distribution system (e.g., tree). The FWD CHN low speed data source 804 may generate parallel, forward (channel) low speed (FLS) data (e.g., control and/or audio data). The REV CHN low speed data sink 806 may receive parallel, reverse (channel) low speed data (e.g., control data).

The system 800 further comprises a serial link interface 820 for interfacing the high speed data source 802, FWD CHN low speed data source 804, and REV CHN low speed data sink 806 to the full-duplex differential serial data link 840. The serial link interface 820 comprises a high speed serializer 822, a FWD CHN differential signal modulator 824, a FWD CHN low speed serializer 826, a REV CHN low speed deserializer 828, and a HS CHN suppression circuit 830. The high speed serializer 822 converts the parallel HS data from the high speed data source 822 into serialized data, and generates a differential signal of the forward channel data for transmission via the full-duplex differential serial data link 840.

The FWD CHN low speed serializer 826, in turn, converts the parallel FLS data from the FWD CHN low speed data source 804 into serial data. The FWD CHN differential signal modulator 824 differentially modulates the forward channel signal with the serialized FLS data. The differential signal modulator 824 may include a slew rate control in order to modulate the forward channel signal in a relatively slow manner in order to control the spectral content of the reverse channel to substantially isolate it from the spectral content of the forward channel. In some cases, the FWD CHN low speed data source 804 may generate the FLS data in a serial manner. In such a case, the FWD CHN low speed serializer 826 may be eliminated, and the FWD CHN low speed data source 804 may be directly coupled to the FWD CHN differential signal modulator 824.

The HS CHN suppression circuit 830 suppresses the high speed forward channel signal in order to substantially output the serial, reverse (channel) low speed (RLS) data received from the opposite end of the full-duplex differential serial data link 840. Similar to the previous embodiments, the HS CHN suppression circuit may be an LPF or BPF adapted to filter out the high-frequency forward channel signal. Also similarly, the HS CHN suppression circuit 830 may be a signal cancellation device for substantially cancelling out the forward channel signal. The REV CHN low speed deserializer 828 converts the serial RLS data into parallel RLS data for processing by the REV CHN low speed data sink 806.

At the other end of the full-duplex differential serial link 840, the system 800 comprises a high speed data sink 856, a FWD CHN low speed data sink 862, and a REV CHN low speed data source 868. The high speed data sink 856 receives and processes the parallel high speed (HS) data (e.g., video data) from the high speed data source 802. The FWD CHN low speed data sink 862 receives and processes the parallel FLS data (e.g., control and/or audio data) from the FWD CHN low speed data source 804. The REV CHN low speed data source 868 generates the parallel, RLS data (e.g., control data) for transmission to the REV CHN low speed data sink 806.

The system 800 further comprises a serial link interface 850 for interfacing the high speed data sink 856, FWD CHN low speed data sink 862, and REV CHN low speed data source 868 to the full-duplex differential serial data link 840. The serial link interface 850 comprises a LS CHN suppression circuit 852, a high speed deserializer 854, a HS CHN suppression circuit 858, a FWD CHN low speed deserializer 860, a REV CHN low speed serializer 866, and a differential signal modulator 864.

The LS CHN suppression circuit 852 suppresses the forward and reverse channel low speed data signal (e.g., the serialized FLS and RLS data) in order to substantially output the serial, forward channel data (e.g., the HS data) received from the opposite end of the full-duplex differential serial data link 840. As an example, the LS CHN suppression circuit 852 may be a RPF or BPF adapted to filter out the low-frequency forward and reverse channel data. The high speed deserializer 854 converts the serial forward channel data into parallel forward channel data. The forward channel data is sent to the high speed data sink 856 for processing.

The HS CHN suppression circuit 858 suppresses the high speed forward channel signal (e.g., the serialized HS data) in order to substantially output the low speed forward channel data (e.g., the FLS data) received from the opposite end of the full-duplex differential serial data link 840. As an example, the HS CHN suppression circuit 858 may be an LPF or BPF adapted to filter out the high-frequency forward channel data. The FWD CHN deserializer 860 converts the 24 serial FLS data into parallel FLS data. The FLS data is sent to the FWD CHN low speed data sink 862 for processing.

The REV CHN low speed serializer 866 converts the parallel RLS data from the REV CHN low speed data source 868 into serial RLS data. The differential signal modulator 864 differentially modulates the forward channel signal with the RLS data. The differential signal modulator 864 may include a slew rate control in order to modulate the forward channel signal in a relatively slow manner in order to control the spectral content of the reverse channel to substantially isolate it from the spectral content of the forward channel. The forward and reverse low speed data are modulated onto the high speed forward channel data at distinct times. Thus, the communications of the low speed forward and reverse channel are in half-duplex mode. However, the high speed forward channel data may be transmitted simultaneously with the low speed forward or reverse channel data. It shall be understood that other forward channel low speed data may be time-multiplexed with the forward channel high speed data; thus, providing two methods for transmitting forward channel low speed data.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus for transferring data using a communication link, comprising:
   a first link interface adapted to generate a forward channel differential signal including high speed serial data for transmission via the communications link; and
   a second link interface adapted to differentially modulate the forward channel differential signal by relatively low speed serial data for transmission in a reverse channel via the communications link, voltage levels of the forward channel differential signal being modulated according to voltage levels of the relatively low speed serial data.

2. The apparatus of claim 1, wherein a first spectral content of the differentially-modulated forward channel signal associated with the relatively high speed serial data does not substantially overlap with a second spectral content of the differentially-modulated forward channel signal associated with the relatively low speed serial data.

3. The apparatus of claim 1, wherein a common mode voltage of the differentially-modulated forward channel signal is substantially constant.

4. The apparatus of claim 1, wherein the communications link comprises a twisted conductor pair or parallel printed circuit board (PCB) traces.

5. The apparatus of claim 1, wherein the first link interface is further adapted to time-multiplex another relatively low speed serial data with the relatively high speed serial data to generate the forward channel differential signal.

6. The apparatus of claim 5, wherein the relatively high speed data comprises video data, and wherein the forward and reverse channel low speed data comprises control data.

7. The apparatus of claim 1, wherein the first link interface further comprises a differential signal modulator adapted to differentially modulate the forward channel differential signal by another relatively low speed serial data for transmission in the forward channel via the communications link.

8. The apparatus of claim 1, wherein the first link interface comprises a first serializer adapted to generate the relatively high speed serial data from relatively high speed parallel data.

9. The apparatus of claim 1, wherein the first link interface further comprises a forward channel suppression circuit adapted to substantially suppress the forward channel signal so as to produce the reverse channel low speed serial data.

10. The apparatus of claim 1, wherein the second link interface comprises a differential signal modulator adapted to differentially modulate the forward channel differential signal with the reverse channel low speed serial data.

11. The apparatus of claim 1, wherein the second link interface further comprises a reverse channel suppression circuit adapted to substantially suppress the reverse channel low speed serial data so as to produce the forward channel high speed serial data.

12. The apparatus of claim 1, wherein the second link interface comprises a forward channel high speed suppression circuit adapted to substantially suppress the forward channel high speed data so as to produce forward channel low speed serial data.

13. An apparatus for communicating data, comprising:
a transmitter adapted to generate a forward channel differential signal including high speed serial data for transmission in a forward channel via a communication link, wherein voltage levels of the forward channel differential signal are differentially modulated according to a reverse channel low speed serial data.

14. The apparatus of claim 13, wherein the transmitter is adapted to timemultiplex the forward channel high speed serial data with a forward channel low speed serial data.

15. The apparatus of claim 13, wherein the forward channel high speed serial data comprises video data, wherein the forward channel low speed serial data comprises audio and forward control data, and wherein the reverse channel low speed serial data comprises reverse control data.

16. The apparatus of claim 13, wherein the forward channel signal is further differentially modulated with the forward channel low speed serial data.

17. An apparatus for communicating data, comprising:
a receiver adapted to receive from a forward channel a forward channel differential signal comprising high speed serial data, wherein voltage levels of the forward channel differential signal are differentially modulated with a reverse channel low speed serial data.

18. The apparatus of claim 17, wherein the receiver is adapted to recover a forward channel low speed serial data which was time-multiplexed with the forward channel high speed serial data.

19. The apparatus of claim 17, wherein the forward channel high speed serial data comprises video data, wherein the forward channel low speed serial data comprises audio and forward control data, and wherein the reverse channel low speed serial data comprises reverse control data.

20. The apparatus of claim 17, wherein the receiver is further adapted to recover forward channel low speed serial data which was differentially modulated onto the forward channel differential signal.

* * * * *